United States Patent
Li et al.

(10) Patent No.: US 6,718,382 B1
(45) Date of Patent: Apr. 6, 2004

(54) TECHNIQUE FOR DETECTING LEAKY POINTS WITHIN A NETWORK PROTOCOL DOMAIN

(76) Inventors: Yunzhou Li, 351 Pawtucket Blvd., Unit 7, Lowell, MA (US) 01854; Billy C. Ng, 1722 N. Shore Dr., Revere, MA (US) 02151

( * ) Notice: Subject to any disclaimer, the term of this patent is extended or adjusted under 35 U.S.C. 154(b) by 0 days.

(21) Appl. No.: 09/248,803

(22) Filed: Feb. 11, 1999

(51) Int. Cl.$^7$ .......................................... G06F 15/173
(52) U.S. Cl. ..................... 709/224; 709/203
(58) Field of Search ......................... 709/224, 204, 709/245, 232, 220, 203, 104, 252; 370/233, 230, 282, 13, 252, 235, 236, 231, 256, 286, 458; 371/49; 713/201, 153; 714/48; 455/555, 419, 502

(56) References Cited

U.S. PATENT DOCUMENTS

| | | | |
|---|---|---|---|
| 5,408,465 A | * 4/1995 | Gusella et al. | 370/231 |
| 5,416,777 A | 5/1995 | Kirkham | 370/85.8 |
| 5,448,567 A | * 9/1995 | Dighe et al. | 370/233 |
| 5,459,871 A | * 10/1995 | Van Den Berg | 709/104 |
| 5,506,838 A | 4/1996 | Flanagan | 370/54 |
| 5,563,874 A | * 10/1996 | Kant | 370/13 |
| 5,636,344 A | * 6/1997 | Lewis | 709/224 |
| 5,768,300 A | * 6/1998 | Sastry et al. | 371/49 |
| 5,796,956 A | * 8/1998 | Jones | 709/233 |
| 5,835,711 A | * 11/1998 | Chang et al. | 709/232 |
| 5,898,689 A | * 4/1999 | Kumar et al. | 370/232 |
| 5,923,850 A | * 7/1999 | Barroux | 709/224 |
| 5,996,001 A | * 11/1999 | Quarles et al. | 709/203 |
| 6,061,668 A | * 5/2000 | Sharrow | 705/400 |
| 6,108,782 A | * 8/2000 | Fletcher et al. | 713/153 |
| 6,111,858 A | * 8/2000 | Greaves et al. | 370/256 |
| 6,151,688 A | * 11/2000 | Wipfel et al. | 714/48 |
| 6,167,027 A | * 12/2000 | Aubert et al. | 370/230 |
| 6,205,551 B1 | * 3/2001 | Grosse | 713/201 |
| 6,220,768 B1 | * 4/2001 | Barroux | 709/224 |
| 6,286,038 B1 | * 9/2001 | Reichmeyer et al. | 709/220 |
| 6,363,056 B1 | * 3/2002 | Beigi et al. | 370/252 |
| 6,473,403 B1 | * 10/2002 | Bare | 370/236 |
| 6,567,379 B1 | * 5/2003 | Walker et al. | 370/235 |

OTHER PUBLICATIONS

Krishnan et al, The Effect of Variance Reduction on the Performance of the Leaky Bucket, IEEE 1995.*

(List continued on next page.)

*Primary Examiner*—Marc D. Thompson
*Assistant Examiner*—Thong Vu
(74) *Attorney, Agent, or Firm*—Steubing McGuinness & Manaras LLP

(57) ABSTRACT

A mechanism for allowing a prober to detect and identify leaky points within a network protocol domain utilizes a Probe Boundary Leak (PBL) protocol to propagate a probe message throughout the network protocol domain. Each PBL router that receives the probe message checks for leaky points in the network protocol domain. Any PBL router that detects a leaky point in the network protocol domain sends a negative response message to the prober including a network address for each leaky point detected by the PBL router. A PBL border router within the network protocol domain being probed sends a positive response message to the prober including a network address for each exit interface supported by the PBL border router. The prober thereby receives a list of "leaky" network interfaces and a list of "non-leaky" exit interfaces for the network protocol domain.

56 Claims, 7 Drawing Sheets

OTHER PUBLICATIONS

Monterio et al, Leaky Analysis for ATM Networks, IEEE 1990.*

Kerekes et al, Dimensioning of Leaky Buckets to be used as Monitors, Electronics Letters 1993.*

Performance of the Leaky Bucket Policing Mechanism for Small Bucket Depths, Electronics Letter, 1990.*

Tam et al, Cell Loss Probability for the Prioritized Leake bucket, IEEE 1995.*

Handley et al., Multicase–Scope Zone Announcement Protocol (MZAP), Internet Draft, Online?, Oct. 7, 1998, XP002197026, MboneD Working Group.

Oct. 7, 1998, Draft of Multicast–Scope Zone Announcement Protocol produced by MboneD Working Group of the Internet Engineering Task Force.

* cited by examiner

TECHNIQUE FOR DETECTING LEAKY POINTS WITHIN A NETWORK PROTOCOL DOMAIN

FIELD OF THE INVENTION

The present invention relates generally to communication networks, and, more particularly, to detecting leaky points within a network protocol domain.

BACKGROUND OF THE INVENTION

In today's information age, communication devices, such as computers and computer peripherals, are often internetworked over a data communication network. The data communication network typically includes a number of interconnected routers that route information from a source communication device to a destination communication device. The routers run various networking protocols in order to provide specialized communication services for the internetworked communication devices.

In order for the data communication network to provide a particular specialized communication service, such as multicasting or security, it is often necessary to set up a network protocol domain to specifically support that specialized communication service. The network protocol domain consists of a number of routers that run a common networking protocol and work together to provide the particular specialized communication service. For convenience, any router at the boundary of the network protocol domain that supports the networking protocol and is configured as a border router for that networking protocol is referred to as a border router. Any other router within the network protocol domain, including a router at the boundary of the network protocol domain that does not support the networking protocol or is not configured as a border router for that networking protocol, is referred to as an intermediate router. Because each network protocol domain is specific to a particular networking protocol, a particular router may be a border router for one networking protocol and an intermediate router for another networking protocol.

For some networking protocols, only the border routers in the network protocol domain are required to run the networking protocol. For other networking protocols, all routers in the network protocol domain are required to run the networking protocol. An intermediate router in the network protocol domain that is required to, but does not, run the networking protocol is considered to be a leaky point in the network protocol domain. Likewise, a border router that runs the same networking protocol in two or more overlapping network protocol domains is considered to be a leaky point in each of the overlapping network protocol domains. These leaky points may cause communication failures and other problems in the network protocol domain. For example, a leaky point in a network protocol domain set up for security may permit an outside communication device to access the network protocol domain without complying with security requirements. Also, a leaky point in a network protocol domain set up for multicasting may cause multicast routing problems within the network protocol domain.

Therefore, a technique for detecting leaky points within a network protocol domain would be useful.

SUMMARY OF THE INVENTION

In accordance with one aspect of the invention, a prober device transmits a probe message over a communication network. The probe message is propagated to a number of probed devices within the communication network. Each probed device that receives the probe message checks for leaky points within a network protocol domain of the communication network. Each probed device that detects a leaky point within the network protocol domain transmits a negative response message to the prober device to indicate that a leaky point was detected.

In accordance with another aspect of the invention, the prober device transmits the probe message to a number of neighboring devices in the communication network and monitors for a probe acknowledgment message from each of the neighboring devices. The prober device considers a neighboring device to be a leaky point within the network protocol domain if the prober device fails to receive a probe acknowledgment message from the neighboring device within a predetermined period of time. Furthermore, the prober device may receive one or more response messages from various probed devices within the communication network. A negative response message from a probed device indicates that the probed device detected a leaky point within the network protocol domain. In a preferred embodiment of the present invention, the negative response message includes a network address for each leaky point detected by the probed device. A positive response message from a probed devices indicates that the probed device is a border device within the network protocol domain. In a preferred embodiment of the present invention, the positive response message includes a network address for each exit interface supported by the border device.

In accordance with yet another aspect of the invention, a probed device receives the probe message from its neighboring device. Upon receiving the probed message, the probed device transmits a probe acknowledgment message to the neighboring device, and then proceeds to check for leaky points within the network protocol domain. The probed device transmits a negative response message to the prober device if the probed device detects a leaky point within the network protocol domain. In a preferred embodiment of the present invention, the negative response message includes a network address for each leaky point detected by the probed device. The probed device transmits a positive response message to the prober device if the probed device is a border device within the network protocol domain. In a preferred embodiment of the present invention, the positive response message includes a network address for each exit interface supported by the border device.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1A:
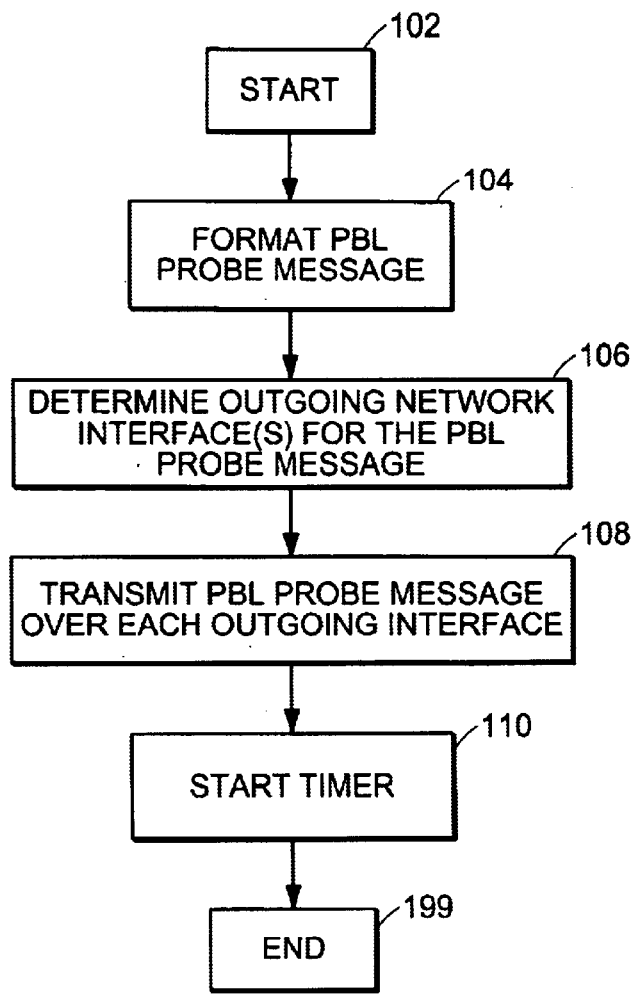
FIG. 1A is a logic flow diagram showing exemplary logic for initiating a probe of a network protocol domain by a PBL Prober of the present invention.

The present invention provides a generic mechanism for detecting leaks for any networking protocol within a bounded network protocol domain. The probing mechanism actively probes the network protocol domain for leaks. The probing mechanism is independent of the networking protocol being probed, and is specific to the network protocol domain being probed. Therefore, the probing mechanism is able to detect a "leaky" router that does not support the networking protocol being probed, and is also able to detect a "leaky" router that does support the networking protocol being probed but is in a different network protocol domain.

The present invention does not represent a first attempt to detect protocol leaks within a communication network. The Multicast-Scope Zone Announcement Protocol (MZAP), described in an Internet Engineering Task Force (IETF) internet draft document entitled *Multicast-Scope Zone Announcement Protocol* (MZAP) and hereby incorporated by reference in its entirety, uses an MZAP-specific mechanism to detect MZAP leaks in a multicast administrative scope zone. Unlike the present invention, though, the MZAP mechanism for detecting leaks is specific to MZAP, and cannot be used to detect leaks for other networking protocols. Furthermore, the MZAP mechanism for detecting leaks is not a primary function of MZAP, and is accomplished by passively monitoring for MZAP messages rather than actively probing for leaks. These and other differences between the active probing mechanism of the present invention and the passive MZAP leak detection mechanism will become apparent from the discussion below.

In the many alternative embodiments of the present invention, a Probe Boundary Leak (PBL) mechanism allows a host or router (referred to hereinafter as the "PBL Prober") to detect and identify leaky points within a network protocol domain. Specifically, each router in the network protocol domain is required to support a PBL protocol (described in detail below) that is used to probe for leaky points in the network protocol domain. For convenience, a router that supports the PBL protocol is referred to hereinafter as a "PBL router," and, more specifically, a border router that supports the PBL protocol is referred to hereinafter as a "PBL border router," while an intermediate router that supports the PBL protocol is referred to hereinafter as a "PBL intermediate router." Generally speaking, the PBL protocol allows the PBL Prober to determine whether or not the network protocol domain is leaky. However, in preferred embodiments of the present invention, the PBL protocol allows the PBL Prober to obtain the network address of each "leaky" network interface and the network address of each "non-leaky" network interface that is an exit point of the network protocol domain. Once any leaky points in the network protocol domain are identified, the leaky points can be fixed, for example, by upgrading a non-PBL router (i.e., a router that does not support the PBL protocol) to support the PBL protocol, loading the unsupported networking protocol on a leaky router, reconfiguring a leaky router, or redesigning the network protocol domain.

The PBL Prober initiates a probe of the network protocol domain by transmitting a PBL Probe message that is propagated by the PBL intermediate routers, hop by hop, toward the boundaries of the network protocol domain. For convenience, the PBL Prober and any PBL intermediate router that propagates the PBL Probe message is sometimes referred to hereinafter as a "PBL Probe message transmitter." Each PBL router that receives the PBL Probe message (referred to hereinafter as a "receiving PBL router") sends a PBL Probe Acknowledgment message in order to confirm that the receiving PBL router supports the PBL protocol. The PBL Probe message prompts the PBL router to check for leaky points (described in detail below) in the network protocol domain. Any PBL router that detects a leaky point transmits a negative PBL Bounce message (described in detail below) to the PBL Prober including the network address of each "leaky" network interface. Each PBL border router that has no "leaky" network interfaces transmits a positive PBL Bounce message (described in detail below) to the PBL Prober including the network address of each exit interface supported by the PBL border router. The PBL Prober sends a PBL Bounce Acknowledgment message in response to each PBL Bounce message. Thus, the PBL Prober receives a list of all "leaky" network interfaces in the network protocol domain as well as a list of all exit interfaces in the network protocol domain.

In a preferred embodiment of the present invention, the PBL protocol is implemented as an application layer protocol that utilizes the User Datagram Protocol (UDP) running over the Internet Protocol (IP) in a Transmission Control Protocol/Internet Protocol (TCP/IP) protocol stack (UDP and IP are well-known protocols in the art). Thus, each PBL message is encapsulated in a UDP user datagram, which in turn is encapsulated in an IP datagram. The IP datagram includes, among other things, a destination IP address for the datagram and a time-to-live (TTL) indicator indicating the maximum number of router hops over which the IP datagram is permitted to traverse before being dropped by the network.

The preferred PBL Probe message includes, among other things, a Prober Address field, a Transaction Identifier field, a Protocol Identifier field, a Domain Identifier field, a Protocol Verification Indicator field, an Original Time-to-Live (TTL) Indicator field, and a Current Time-to-Live (TTL) Indicator field. The Prober Address is a four (4) byte field containing the Internet Protocol (IP) address of the PBL Prober. The Transaction Identifier is a four (4) byte field containing a unique number for correlating all PBL activities relating to a single network protocol domain probe. The Protocol Identifier is a two (2) byte field identifying the networking protocol being probed. The Domain Identifier is a four (4) byte field identifying the network protocol domain. The Protocol Verification Indicator is a one (1) bit field that, when set to the value one (1), indicates that all PBL intermediate routers are required to support the networking protocol being probed. The Original Time-to-Live Indicator is a one (1) byte field indicating a maximum number of hops that the PBL Probe message is permitted to traverse within the network protocol domain. The Current Time-to-Live Indicator is a one (1) byte field indicating a current TTL value equal to the Original TTL Indicator minus the number of hops over which the PBL Probe message has traversed. Each PBL intermediate router that forwards the PBL Probe message decrements the Current TTL Indicator in the forwarded PBL Probe message. It should be noted that the Original TTL Indicator and Current TTL Indicator are part of the PBL message, and are distinct from the TTL indicator in the IP datagram.

The preferred PBL Probe Acknowledgment message includes, among other things, a Prober Address field, a Transaction Identifier field, and a Protocol Identifier field. The Prober Address is a four (4) byte field containing the Internet Protocol (IP) address of the PBL Prober from the PBL Probe message. The Transaction Identifier is a four (4) byte field containing the unique transaction identifier number from the PBL Probe message. The Protocol Identifier is a two (2) byte field identifying the networking protocol being probed.

The preferred PBL Bounce message includes, among other things, a Prober Address field, a Transaction Identifier field, a Protocol Identifier field, a Distance Indicator field, a Return Code field, an Address List Length field, and an Address List field. The Prober Address is a four (4) byte field containing the Internet Protocol (IP) address of the PBL Prober from the PBL Probe message. The Transaction Identifier is a four (4) byte field containing the unique transaction identifier number from the PBL Probe message. The Protocol Identifier is a two (2) byte field identifying the networking protocol being probed. The Distance Indicator is a one (1) byte field indicating the number of router hops between the PBL Prober and the PBL router transmitting the PBL Bounce message, which is calculated using the Original TTL Indicator and the Current TTL Indicator fields from the PBL Probe message. The Return Code is a one (1) byte field indicating a probe result (described in more detail below). The Address List Length is a one (1) byte field indicating the number of addresses included in the Address List field. The Address List includes a number of four (4) byte network addresses.

As described above, the Result Code field in the PBL Bounce message indicates a probe result. The Result Code value zero (0) indicates a positive PBL Bounce message, and signifies that the transmitting PBL border router supports the networking protocol being probed and is within the network protocol domain being probed. The Address List in a positive PBL Bounce message includes the network address of each exit interface supported by the PBL border router. Other Result Code values indicate a negative PBL Bounce message. Specifically, the Result Code value one (1) indicates that the transmitting PBL border router is not within the network protocol domain being probed, in which case the Address List includes the network address of the incoming interface. The Result Code value two (2) indicates that the transmitting PBL intermediate router does not support the networking protocol being probed when the Protocol Verification Indicator in the PBL Probe message is set to one (1), in which case the Address List includes the network address of the incoming interface. The Result Code value three (3) indicates that the PBL Probe message traversed the maximum number of hops permitted without reaching a PBL border router, in which case the Address List includes the network address of the transmitting PBL intermediate router. The Result Code value four (4) indicates that the transmitting PBL intermediate router detected one or more non-PBL routers, in which case the Address List includes the network address of each non-PBL router detected.

The preferred PBL Bounce Acknowledgment message includes, among other things, a Prober Address field, a Transaction Identifier field, and a Protocol Identifier field. The Prober Address is a four (4) byte field containing the Internet Protocol (IP) address of the PBL Prober from the PBL Probe message. The Transaction Identifier is a four (4) byte field containing the unique transaction identifier number from the PBL Probe message. The Protocol Identifier is a two (2) byte field identifying the networking protocol being probed.

The various elements and workings of the PBL protocol are described below with reference to various exemplary embodiments of the present invention. For the sake of simplicity, the exemplary embodiments shown and described below are based upon a single PBL transaction for probing a particular networking protocol in a particular network protocol domain. In actuality, however, there may be multiple simultaneous PBL transactions initiated by one or more PBL Probers and covering the same or different networking protocols and/or network protocol domains. Therefore, in order to fully support the PBL protocol, the PBL routers typically include logic to correlate all actions relating to a particular PBL transaction, for example, by maintaining protocol state information separately for each PBL transaction based upon the Transaction Identifier in the PBL Probe message. Such correlation logic is not shown or described in the exemplary embodiments below, although it will be apparent to a skilled artisan how the various exemplary embodiments can be modified to include such correlation logic.

In order to probe the network protocol domain, the PBL Prober first formats the PBL Probe message. The PBL Prober sets the Prober Address field equal to the network address of the PBL Prober, and sets the Transaction Identifier field equal to a unique transaction identifier value. The PBL Prober then sets the Protocol Identifier field and the Domain Identifier field according to the networking protocol and the network protocol domain being probed, respectively. The PBL Prober sets the Protocol Verification Indicator field to the value one (1) if all PBL intermediate routers are required to support the networking protocol being probed. The PBL Prober sets both the Original TTL Indicator field and the Current TTL Indicator field to a predetermined value indicating the maximum number of router hops that the PBL Probe message is permitted to traverse before reaching a PBL border router.

The PBL Prober then transmits the formatted PBL Probe message. As described above, the PBL Probe message is encapsulated in a UDP user datagram, which in turn is encapsulated in an IP datagram. In a preferred embodiment of the present invention, the PBL Probe message is transmitted with a destination IP address equal to an all-router multicast address 224.0.0.2 and a time-to-live (TTL) equal to one (1). If the PBL Prober is a host or a router outside of the network protocol domain, then the PBL Prober transmits the PBL Probe message to a PBL router in the network protocol domain. If the PBL Prober is a router within the network protocol domain, then the PBL Prober transmits the PBL Probe message to each of the its neighboring routers. A preferred PBL router discovers its neighboring router(s) using a router solicitation/advertisement mechanism described in the Internet Engineering Task Force (IETF) Request For Comments (RFC) document number 1256 entitled *ICMP Router Discovery Messages* (September 1991), incorporated herein by reference in its entirety.

After transmitting the PBL Probe message over one or more network interfaces, the PBL Prober monitors each network interface for a PBL Probe Acknowledgment message. As described above, each receiving PBL router acknowledges receipt of the PBL Probe message by transmitting a PBL Probe Acknowledgment message back to the PBL Probe message transmitter over the incoming interface. If the PBL Prober fails to receive a PBL Probe Acknowledgment message over a particular network interface within a predetermined period of time, then that network interface is considered to be a leaky point in the network protocol domain. Because UDP is an unreliable, connectionless protocol, the PBL Prober may retransmit the PBL Probe message a number of times over the particular network interface before considering the network interface to be a "leaky" network interface. The PBL Prober stores the network address of each "leaky" network interface.

Upon receiving a PBL Probe message, a receiving PBL router transmits a PBL Probe Acknowledgment message back to the PBL Probe message transmitter over the incoming interface. The receiving PBL router then processes the PBL Probe message. The PBL Probe message processing depends upon, among other things, whether the receiving PBL router is a PBL border router or a PBL intermediate router.

A PBL border router represents a termination point for the PBL Probe message, and therefore the PBL border router does not propagate the PBL Probe message to its neighboring routers. Therefore, after transmitting the PBL Probe Acknowledgment message, the PBL border router (which, by definition, supports the networking protocol identified by the Protocol Identifier in the PBL Probe message) determines whether it is a leaky PBL border router or a non-leaky PBL border router based upon the Domain Identifier in the PBL Probe message. The PBL border router is considered to be a non-leaky PBL border router if the PBL border router is within the network protocol domain being probed, as identified by the Domain Identifier in the PBL Probe message. Otherwise, the PBL border router is considered to be a leaky PBL border router.

If the receiving PBL router is a non-leaky PBL border router, then the receiving PBL router transmits a positive PBL Bounce message to the PBL Prober. In certain network protocol domain configurations, it is possible for the non-leaky PBL border router to receive the same PBL Probe message multiple times over separate network interfaces. When this occurs, it is preferable for the non-leaky PBL border router to transmit a single positive PBL Bounce message in response to the multiple PBL Probe messages rather than transmitting a positive PBL Bounce message for each PBL Probe message (although each PBL Probe message is acknowledged as described above). Therefore, upon receiving a first PBL Probe message, the non-leaky PBL border router stores the incoming interface address as both an exit interface and the interface over which to transmit the positive PBL Bounce message, and starts a timer for a predetermined timer period. In a preferred embodiment of the present invention, the predetermined timer period is three (3) seconds. Upon receiving any subsequent PBL Probe message during the timer period, the non-leaky PBL border router acknowledges the PBL Probe message as described above, and stores the incoming interface address as an exit interface. When the timer expires, the non-leaky PBL border router transmits the single positive PBL Bounce message to the PBL Prober over the stored incoming interface. The positive PBL Bounce message includes a Return Code indicating that the border router matches both the Protocol Identifier and the Domain Identifier. The positive PBL Bounce message also includes the network address of each exit interface supported by the border router. In this way, the PBL Prober receives a single positive PBL Bounce message including the network address for each exit interface supported by the non-leaky PBL border router.

If the receiving PBL router is a leaky PBL border router, then the receiving PBL router transmits a negative PBL Bounce message to the PBL Prober. In certain network protocol domain configurations, it is possible for the leaky PBL border router to receive the same PBL Probe message multiple times over separate network interfaces. When this occurs, the leaky PBL border router transmits a separate negative PBL Bounce message for each PBL Probe message received. The negative PBL Bounce message includes the Return Code equal to one (1) indicating that the border router matches the Protocol Identifier but not the Domain Identifier. The negative PBL Bounce message also includes the network address of the incoming interface over which the corresponding PBL Probe message was received. In this way, the PBL Prober receives the network address of each "leaky" network interface associated with the leaky PBL border router.

If the receiving PBL router is a PBL intermediate router, then the receiving PBL router may or may not be required to support the networking protocol being probed. Therefore, after transmitting the PBL Probe Acknowledgment message, the receiving PBL router uses the Protocol Verification Indicator in the PBL Probe message to decide whether or not to verify support for the networking protocol being probed. If the Protocol Verification Indicator is set to one (1), indicating that the receiving PBL router is required to support the networking protocol identified by the Protocol Identifier in the PBL Probe message, but the receiving PBL router does not support the networking protocol identified by the Protocol Identifier in the PBL Probe message, then the receiving PBL router transmits a negative PBL Bounce message to the PBL Prober. The negative PBL Bounce message includes the Return Code equal to two (2) indicating that the receiving PBL router does not support the networking protocol being probed. The negative PBL Bounce message also includes the network address of the incoming interface.

If the receiving PBL router is a PBL intermediate router that either supports the networking protocol being probed or is not required to support the networking protocol being probed, then the receiving PBL router decides whether or not to propagate the PBL Probe message to its neighboring routers. In certain network protocol domain configurations, it is possible for the receiving PBL router to receive the same PBL Probe message multiple times over separate network interfaces. When this occurs, the receiving PBL router only propagates the first PBL Probe message received, and discards any subsequent PBL Probe messages. Therefore, after transmitting the PBL Probe Acknowledgment message, the receiving PBL router determines whether the PBL Probe message is a duplicate of a previously received and propagated PBL Probe message. If the PBL Probe message is a duplicate of a previously received and propagated PBL Probe message, then the receiving PBL router discards the PBL Probe message.

Assuming, however, that the PBL Probe message is not a duplicate of a previously received and propagated PBL Probe message, then the receiving PBL router checks the Current TTL Indicator in the PBL Probe message to determine whether or not the PBL Probe message has traversed the maximum number of hops permitted, and therefore whether or not the PBL Probe message is permitted to be propagated further. In a preferred embodiment of the present invention, a Current TTL Indicator value of one (1) indicates that the PBL Probe message has already traversed the maximum number of hops permitted, while a Current TTL Indicator value greater than one (1) indicates that the PBL Probe message has not already traversed the maximum number of hops permitted.

If the PBL Probe message has already traversed the maximum number of hops permitted, then the receiving PBL router transmits a negative PBL Bounce message to the PBL Prober. The negative PBL Bounce message includes the Return Code equal to three (3) indicating that the PBL Probe message traversed the maximum number of hops without reaching a PBL border router. The negative PBL Bounce message also includes the network address of the incoming interface.

If the PBL Probe message has not traversed the maximum number of hops permitted, then the receiving PBL router propagates the PBL Probe message to its neighboring routers by decrementing the Current TTL Indicator in the PBL Probe message and transmitting the PBL Probe message to each of the its neighboring routers. After transmitting the PBL Probe message over one or more network interfaces, the PBL router monitors each network interface for a PBL Probe Acknowledgment message. As described above, each receiving PBL router acknowledges receipt of the PBL Probe message by transmitting a PBL Probe Acknowledgment message back to the PBL Probe message transmitter over the incoming interface. If the PBL router fails to receive a PBL Probe Acknowledgment message from a particular neighboring router within a predetermined period of time, then that neighboring router is considered to be a non-PBL router, and therefore a leaky point in the network protocol domain. Because UDP is an unreliable, connectionless protocol, the PBL router may retransmit the PBL Probe message a number of times to the particular neighboring router before considering the neighboring router to be a leaky point. Upon detecting one or more non-PBL routers, the PBL router transmits a negative PBL Bounce message to the PBL Prober. The negative PBL Bounce message includes the Return Code equal to four (4) indicating that a non-PBL router was discovered. The negative PBL Bounce message also includes the network address of each such non-PBL router from which no PBL Probe Acknowledgment message was received.

For each PBL Bounce message received by the PBL Prober, the PBL Prober responds by sending a PBL Bounce Acknowledgment message. In a preferred embodiment of the present invention, a PBL router may periodically retransmit the PBL Bounce message until it receives a PBL Bounce Acknowledgment message from the PBL Prober.

FIGS. 1A through 1E are logic flow diagrams showing exemplary PBL Prober logic for detecting leaky points within a network protocol domain. FIG. 1A shows exemplary PBL Prober logic for initiating a probe of the network protocol domain. Beginning at step 102, the PBL Prober formats the PBL Prober message, in step 104. The PBL Prober then determines the outgoing network interface(s) to be probed, in step 106, and transmits the PBL Probe message to a neighboring router over each outgoing network interface, in step 108. The PBL Prober then starts a timer, in step 110, and terminates in step 199.

After initiating the probe of the network protocol domain, the PBL Prober monitors each of the outgoing network interfaces for a PBL Probe Acknowledgment message sent by the neighboring router, and also monitors for PBL Bounce messages sent by various PBL routers. The PBL Prober continues to monitor for the PBL Probe Acknowledgment and PBL Bounce messages until the timer expires.

Figure 1B:
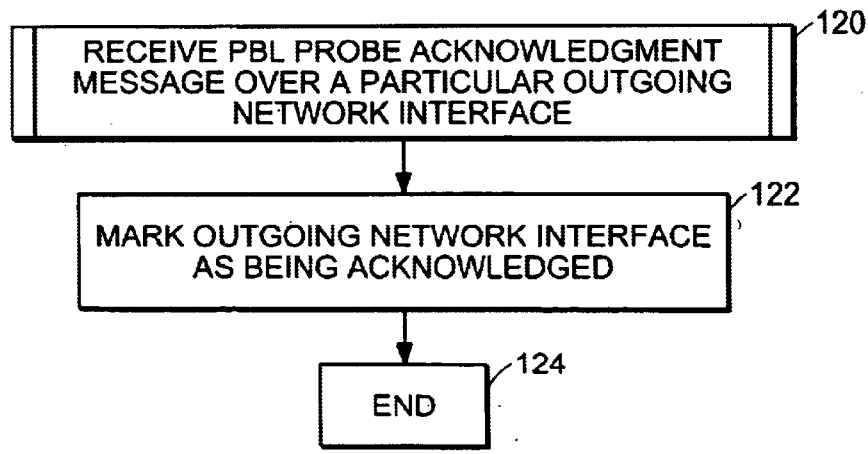
FIG. 1B is a logic flow diagram showing exemplary logic for processing a PBL Probe Acknowledgment message in a PBL Prober of the present invention.

FIG. 1B shows exemplary PBL Prober logic for processing a PBL Probe Acknowledgment message. Upon receiving a PBL Probe Acknowledgment message over a particular outgoing network interface, in step 120, the PBL Prober marks the outgoing network interface as being acknowledged, in step 122, and terminates in step 124. By marking the outgoing network interface as being acknowledged, the PBL Prober identifies the outgoing network interface as a "non-leaky" network interface.

Figure 1C:
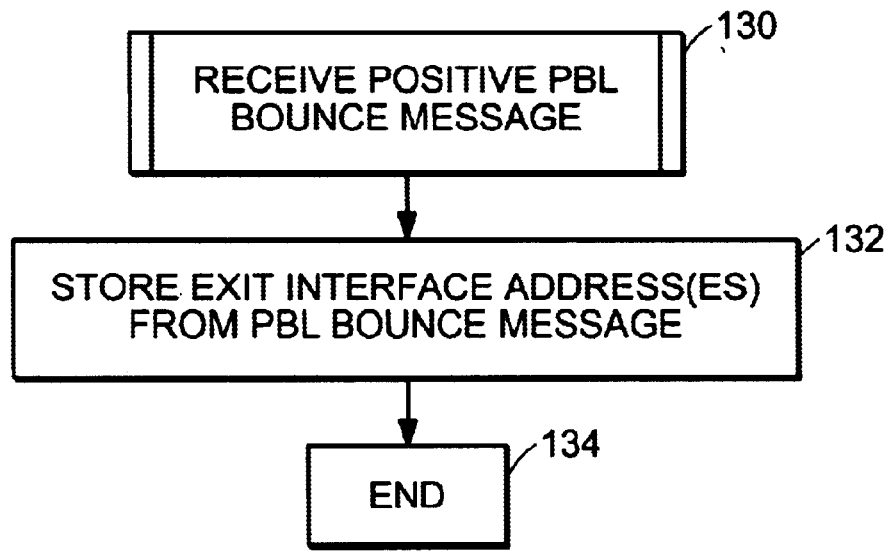
FIG. 1C is a logic flow diagram showing exemplary logic for processing a positive PBL Bounce message in a PBL Prober of the present invention.

FIG. 1C shows exemplary PBL Prober logic for processing a positive PBL Bounce message. Upon receiving a positive PBL Bounce message, in step 130, the PBL Prober stores the exit interface address(es) from the Address List in the PBL Bounce message, in step 132, and terminates in step 134.

Figure 1D:
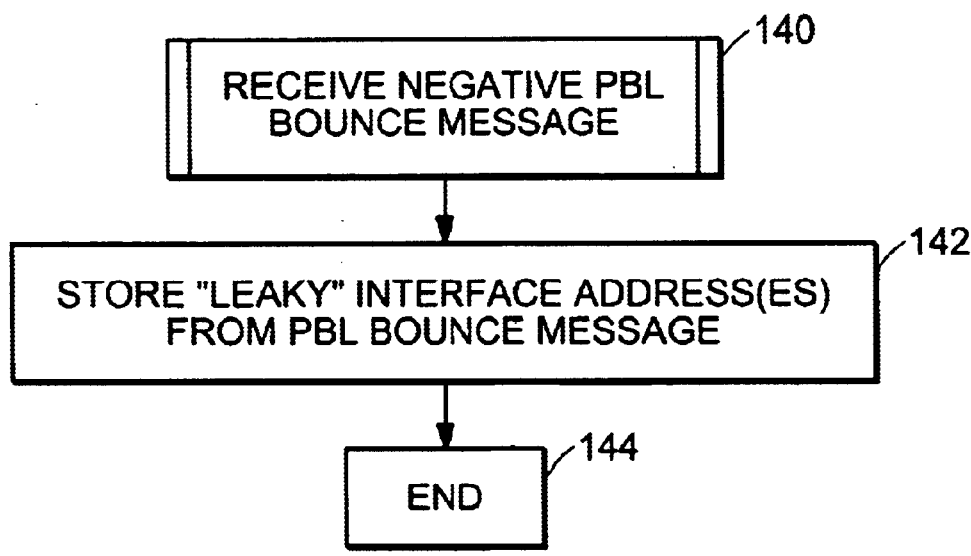
FIG. 1D is a logic flow diagram showing exemplary logic for processing a negative PBL Bounce message in a PBL Prober of the present invention.
Figure 1E:
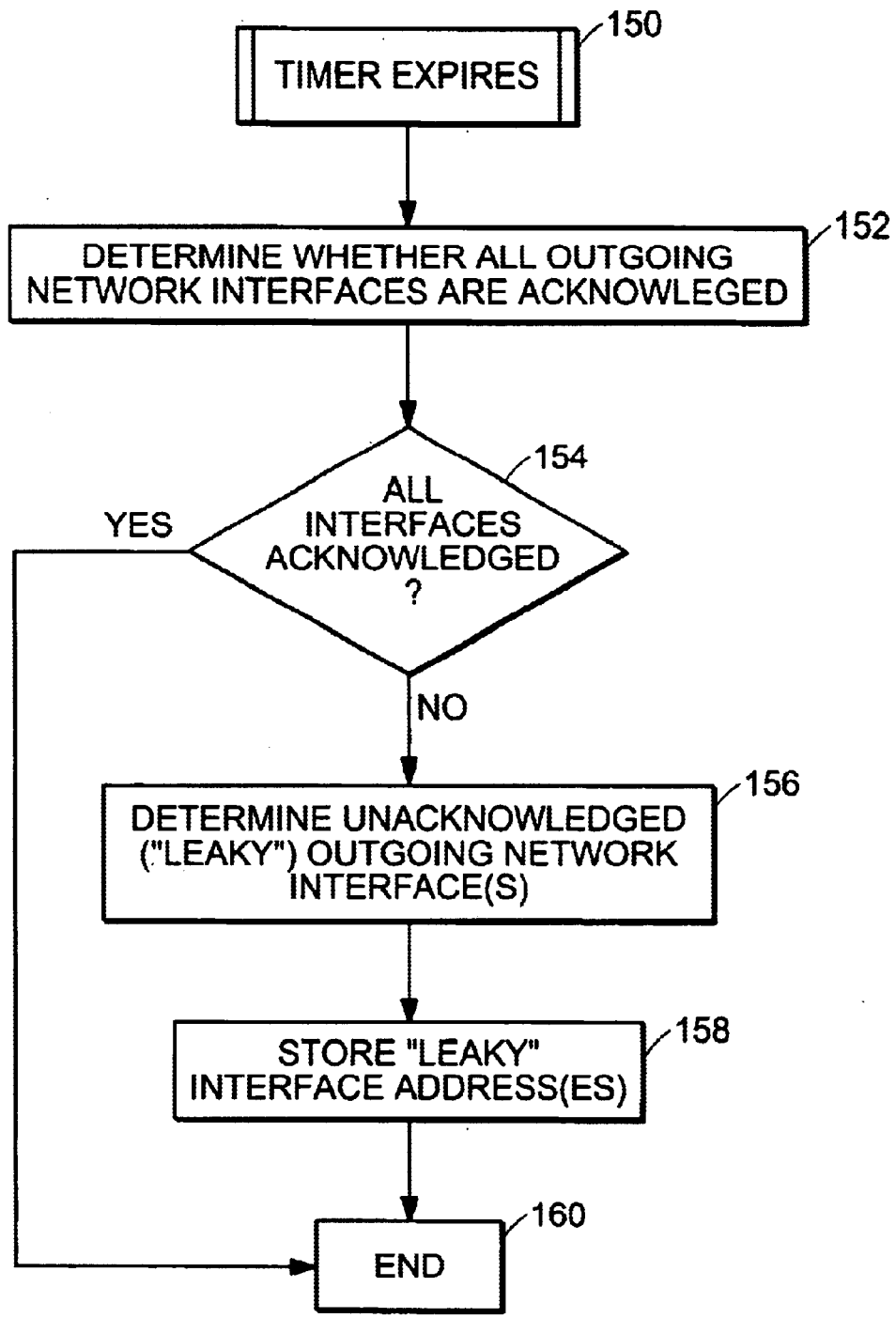
FIG. 1E is a logic flow diagram showing exemplary logic for determining "leaky" network interfaces in a PBL Prober of the present invention.

FIG. 1D shows exemplary PBL Prober logic for processing a negative PBL Bounce message. Upon receiving a negative PBL BOUNCE message, in step 140, the PBL Prober stores the "leaky" interface address(es) from the Address List in the PBL Bounce message, in step 142, and terminates in step 144.

When the timer expires (step 150 in FIG. 1E), the PBL Prober determines whether a PBL Probe Acknowledgment message was received over each outgoing network interface, in step 152. If all outgoing network interfaces were acknowledged (YES in step 154), then the PBL Prober terminates in step 160, at which time the probe of the network protocol domain is complete.

However, if at least one outgoing network interface was not acknowledged (NO in step 154), then the PBL Prober determines the unacknowledged (i.e., "leaky") outgoing network interfaces, in step 156, and stores the "leaky" interface address(es), in step 158. The terminates in step 160, at which time the probe of the network protocol domain is complete.

Figure 2A:
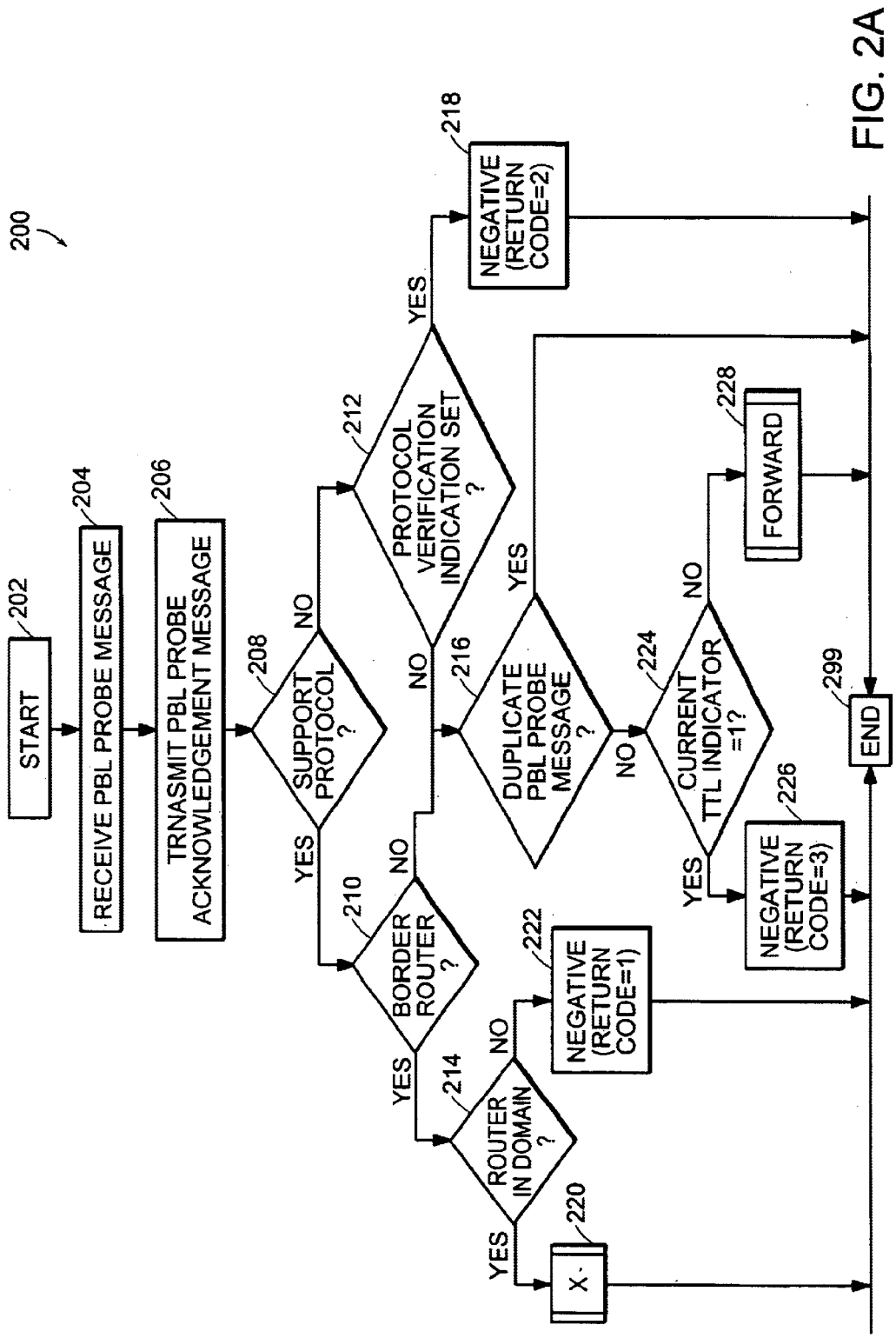
FIG. 2A is a logic flow diagram showing exemplary logic for processing a PBL Probe message in a PBL router of the present invention.

FIGS. 2A through 2D are logic flow diagrams showing exemplary PBL router logic for processing a PBL Probe message. With reference to FIG. 2A, the PBL router begins at step 202, and upon receiving a PBL Probe message in step 204, the PBL router first acknowledges the PBL Probe message by transmitting a PBL Probe Acknowledgment message to the PBL Probe message transmitter over the incoming interface, in step 206. The PBL router then processes the PBL Probe message.

In this exemplary embodiment, the PBL router first determines whether or not it supports the networking protocol being probed, in step 208. The networking protocol being probed is identified by the Protocol Identifier in the PBL Probe message.

If the PBL router supports the networking protocol being probed (YES in step 208), then the PBL router determines whether or not it is configured as a border router for the networking protocol, in step 210.

If the PBL router is configured as a border router for the networking protocol being probed (YES in step 210), then the PBL router determines whether or not it is within the network protocol domain being probed, in step 214. The network protocol domain is identified by the Domain Identifier in the PBL Probe message.

Figure 2B:
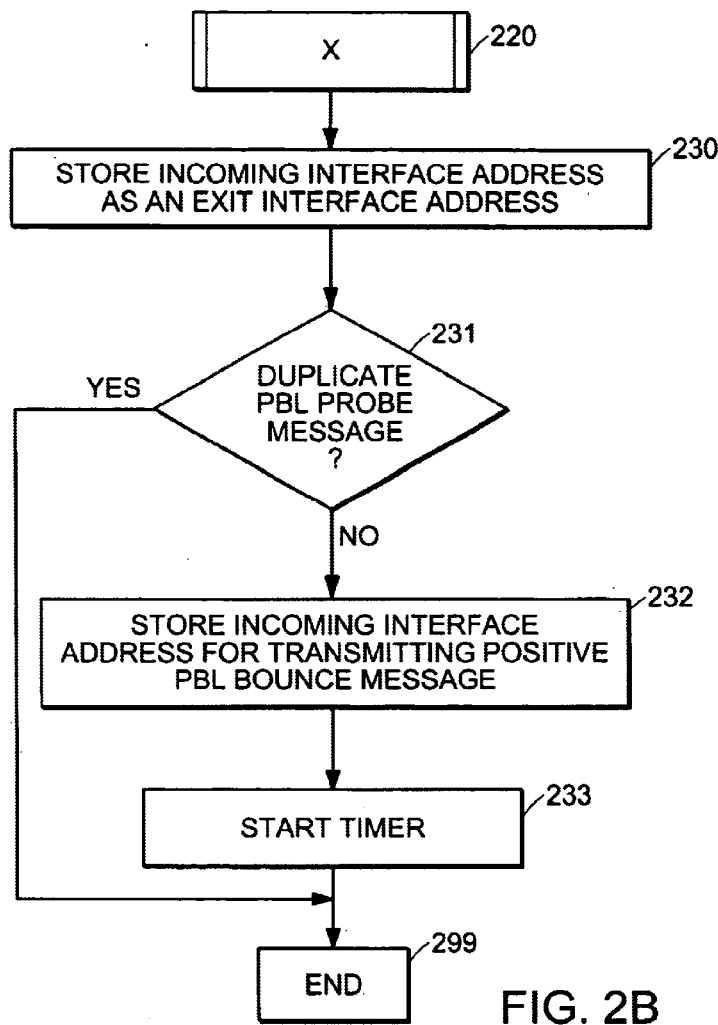
FIG. 2B is a logic flow diagram showing exemplary logic for processing the PBL Probe message in a PBL border router of the present invention within the network protocol domain being probed.
Figure 2C:
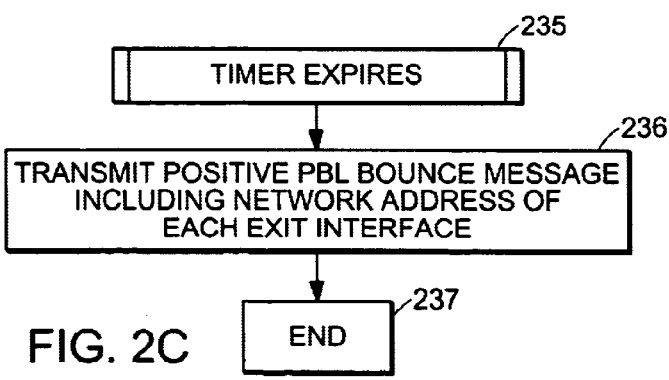
FIG. 2C is a logic flow diagram showing exemplary logic for transmitting a positive PBL Bounce message in a PBL border router of the present invention within the network protocol domain being probed.

If the PBL border router is within the network protocol domain being probed (YES in step 214), then the PBL router proceeds to step 220, as shown in FIG. 2B. At step 220, the PBL router first stores the incoming interface address as an exit interface address for the network protocol domain, in step 230. The PBL router then determines whether the PBL Probe message is a duplicate PBL Probe message, in step 231. The PBL Probe message is considered to be a duplicate PBL Probe message if the Transaction Identifier in the PBL Probe message matches the Transaction Identifier of a previously received and processed PBL Probe message.

If the PBL Probe message is a duplicate PBL Probe message (YES in step 231), then the PBL router performs no further processing on the PBL Probe message, and terminates in step 299.

If the PBL Probe message is not a duplicate PBL Probe message (NO in step 231), then the PBL router stores the incoming interface address for transmitting the positive PBL Bounce message, in step 232, starts a timer, in step 233, and terminates in step 299.

When the timer expires (step 235 in FIG. 2C), the PBL router transmits a positive PBL Bounce message to the PBL Prober including the network address of each exit interface supported by the PBL router, in step 236, and terminates in step 237.

If the PBL border router is not within the network protocol domain being probed (NO in step 214), then the PBL router transmits a negative PBL Bounce message to the PBL Prober, in step 222. The negative PBL Bounce message includes a Return Code of one (1) to indicate that the PBL border router is not within the network protocol domain being probed. The negative PBL Bounce message also includes an Address List including the network address of the incoming interface.

If the PBL router is not configured as a border router for the networking protocol being probed (NO in step 210), then the PBL router proceeds to step 216 (described in detail below).

If the PBL router does not support the network protocol being probed (NO in step 208), then the PBL router determines whether or not the PBL router is required to support the networking protocol being probed based upon the Protocol Verification Indicator in the PBL Probe message, in step 212. If the Protocol Verification Indicator in the PBL Probe message is set to one (1), then the PBL router is required to support the networking protocol being probed; otherwise, the PBL router is not required to support the networking protocol being probed.

If the PBL router is required to support the networking protocol being probed (YES in step 212), then the PBL router transmits a negative PBL Bounce message to the PBL Prober, in step 218. The negative PBL Bounce message includes a Return Code of two (2) to indicate that the PBL router does not support the networking protocol being probed. The negative PBL Bounce message also includes an Address List including the network address of the incoming interface.

If the PBL router is not required to support the networking protocol being probed (NO in step 212), then the PBL router proceeds to step 216.

At step 216, the PBL router determines whether or not the PBL Probe message is a duplicate PBL Probe message. The PBL Probe message is considered to be a duplicate PBL Probe message if the Transaction Identifier in the PBL Probe message matches the Transaction Identifier of a previously received and processed PBL Probe message.

If the PBL Probe message is a duplicate PBL Probe message (YES in step 216), then the PBL router discards the PBL Probe message by terminating in step 299.

If the PBL Probe message is not a duplicate PBL Probe message (NO in step 216), then the PBL router determines whether or not the PBL Probe message has traversed the maximum number of hops permitted based upon the Current TTL Indicator in the PBL Probe message, in step 224. A Current TTL Indicator value of one (1) indicates that the PBL Probe message has traversed the maximum number of hops permitted without reaching a PBL border router. A Current TTL Indicator value greater than one (1) indicates that the PBL Probe message has not traversed the maximum number of hops permitted.

If the Current TTL Indicator in the PBL Probe message is equal to one (1), indicating that the PBL Probe message has traversed the maximum number of hops permitted without reaching a PBL border router (YES in step 224), then the PBL router transmits a negative PBL Bounce message to the PBL Prober, in step 226. The negative PBL Bounce message includes a Return Code of three (3) to indicate that the PBL Probe message did not reach a PBL border router within the maximum number of hops permitted. The negative PBL Bounce message also includes an Address List including the network address of the PBL router.

Figure 2D:
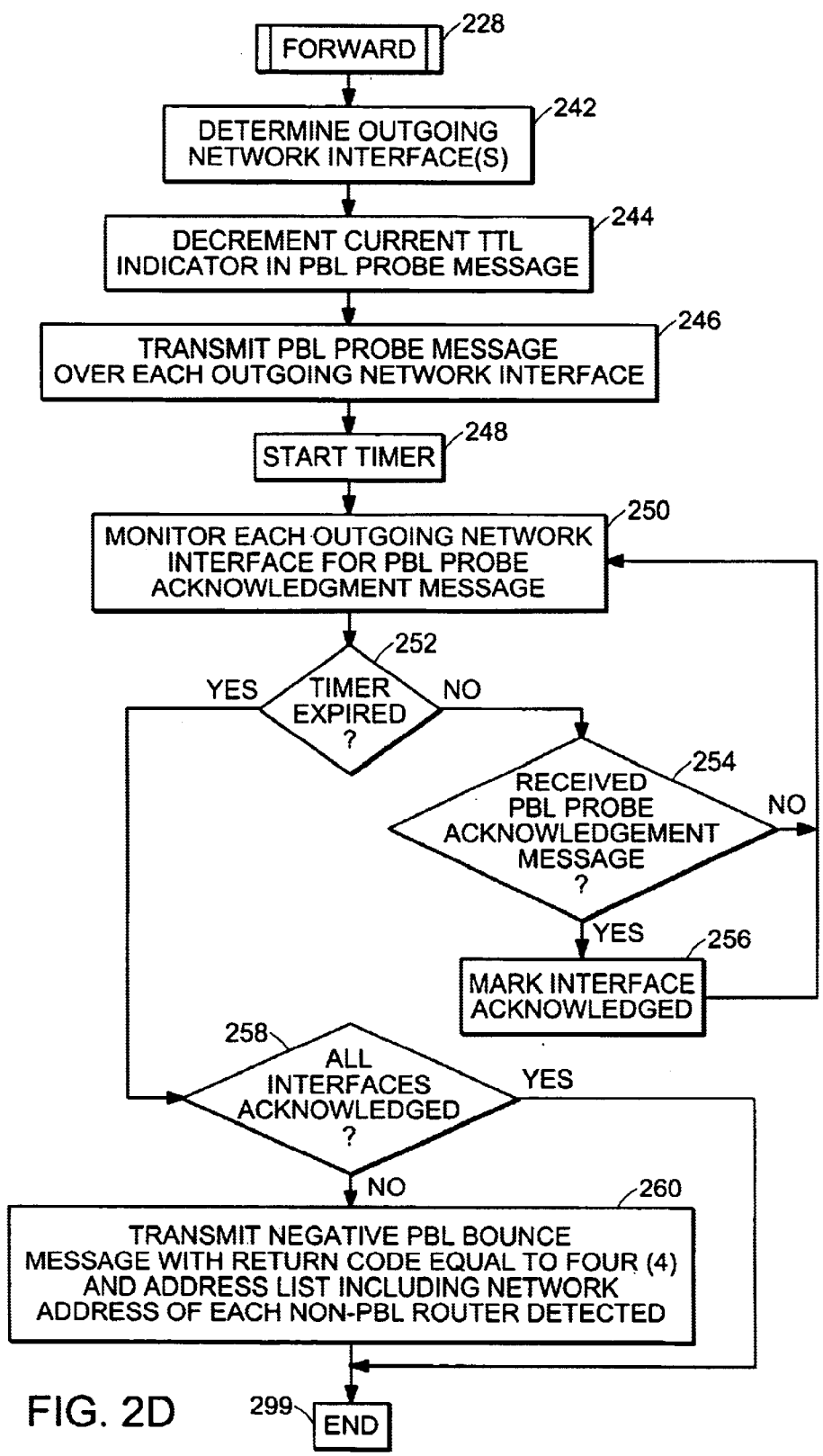
FIG. 2D is a logic flow diagram showing exemplary logic for forwarding the PBL Probe message in a PBL intermediate router of the present invention.

If the Current TTL Indicator in the PBL Probe message is greater than one (1), indicating that the PBL Probe message has not traversed the maximum number of hops permitted (NO in step 224), then the PBL router proceeds to step 228, as shown in FIG. 2D. At step 228, the PBL router first determines the outgoing network interface(s) over which the PBL Probe message is to be forwarded, in step 242. The PBL router then decrements the Current TTL Indicator in the PBL Probe message, in step 244, and transmits the PBL Probe message to its neighboring routers over each outgoing network interface, in step 246. The PBL router then starts a timer, in step 248, and monitors each outgoing network interface for a PBL Probe Acknowledgment message, in step 250. The PBL Prober continues to monitor for the PBL Probe Acknowledgment messages until the timer expires (YES in step 252). For each PBL Probe Acknowledgment message received during the timer period (YES in step 254), the PBL router marks the corresponding network interface as being acknowledged. When the timer expires (YES in step 252), the PBL Prober determines whether a PBL Probe Acknowledgment message was received over each outgoing network interface, in step 258. If all outgoing network interfaces were acknowledged (YES in step 258), then the PBL router terminates in step 299. However, if at least one outgoing network interface was not acknowledged (NO in step 258), then the PBL transmits a negative PBL Bounce message to the PBL Prober, in step 260. The negative PBL Bounce message includes a Return Code of four (4) to indicate that the PBL router detected a non-PBL router. The negative PBL Bounce message also includes an Address List including the network address of each non-PBL router detected.

Figure 3:
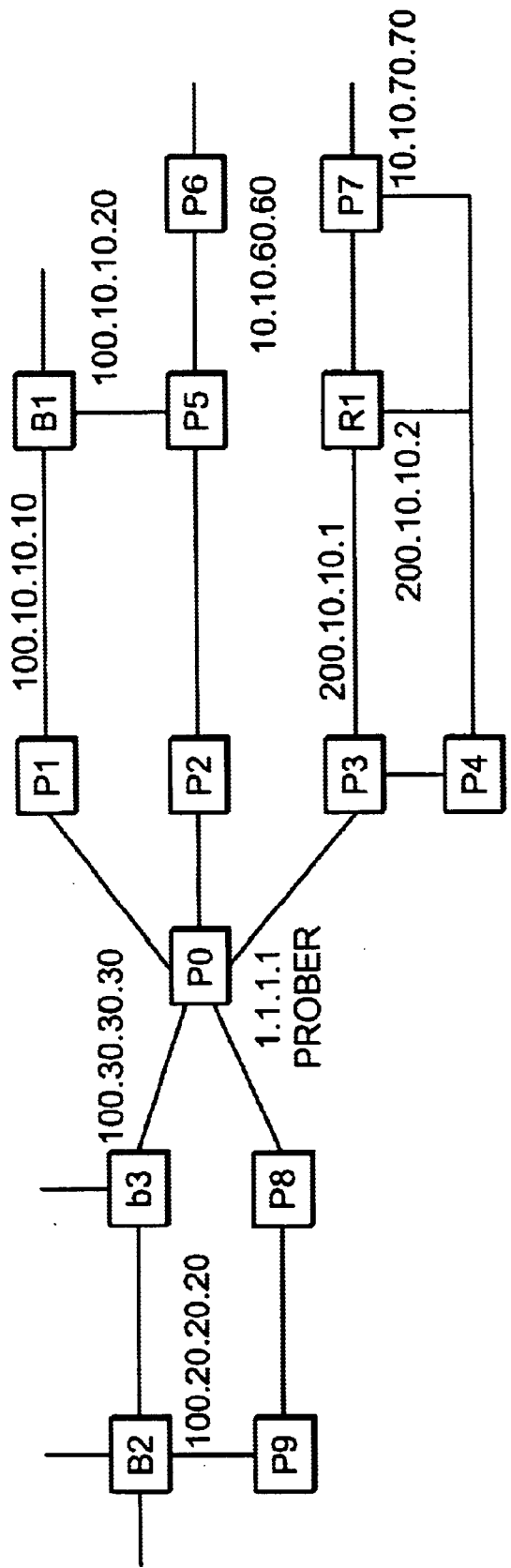
FIG. 3 is a block diagram showing an exemplary router network in accordance with an embodiment of the present invention.

Various elements and workings of the subject PBL protocol can be demonstrated by example. FIG. 3 is a block diagram showing an exemplary router network. The exemplary router network includes a PBL Prober router P0, PBL intermediate routers P1 through P9, a non-PBL router R1, PBL border routers B1 and B2 within the network protocol domain, and a PBL border router b3 supporting the networking protocol but in a different network protocol domain.

In order to probe the network protocol domain, the PBL Prober router P0 transmits a PBL Probe message to each of its neighboring routers P1, P2, P3, P8, and b3. The PBL Probe message includes the following information:

Prober Address=1.1.1.1
Transaction Identifier=1
Protocol Identifier=1
Domain Identifier=1.1.1.1
Protocol Verification Indicator=0
Original TTL Indicator=3
Current TTL Indicator=3

Upon receiving the PBL Probe message from the PBL Prober router P0, the PBL border router b3 sends a PBL Probe Acknowledgment message to the PBL Prober router P0. Even though the PBL border router b3 is a border router that supports the networking protocol being probed, the PBL border router b3 is not within the network protocol domain being probed. Therefore, the PBL border router b3 transmits a negative PBL Bounce message to the PBL Prober router P0 indicating that the PBL border router b3 is not within the network protocol domain and including the network address of the incoming interface. The negative PBL Bounce message includes the following information:

Prober Address=1.1.1:1
Transaction Identifier=1
Distance Indicator=1
Return Code=1
Address List Length=1
Address List=100.30.30.30

Upon receiving the PBL Probe message from the PBL Prober router P0, the PBL router P8 sends a PBL Probe Acknowledgment message to the PBL Prober router P0. The PBL router then propagates the PBL Probe message to PBL router P9. Specifically, the PBL router P8 decrements the Current TTL Indicator in the PBL Probe message, resulting in a Current TTL Indicator value of two (2), and forwards the PBL Probe message to the PBL router P9.

Upon receiving the PBL Probe message from the PBL router P8, the PBL router P9 sends a PBL Probe Acknowledgment message to the PBL router P8, decrements the Current TTL Indicator in the PBL Probe message, and forwards the PBL Probe message to the PBL border router B2.

Upon receiving the PBL Probe message from the PBL router P9, the PBL border router B2 sends a PBL Probe Acknowledgment message to the PBL router P9. The PBL border router B2 then determines that is a border router within the network protocol domain being probed. The PBL border router B2 therefore stores the network interface address 100.20.20.20 as an exit interface, starts a timer, and monitors for duplicate PBL Probe messages received over other network interfaces. When the timer expires, the PBL border router B2 transmits a positive PBL Bounce message to the PBL Prober router P0 including the network address of the exit interface 100.20.20.20. The positive PBL Bounce message includes the following information:

Prober Address=1.1.1.1
Transaction Identifier=1
Distance Indicator=3
Return Code=0
Address List Length=1
Address List=100.20.20.20

Upon receiving the PBL Probe message from the PBL Prober router P0, the PBL router P3 sends a PBL Probe Acknowledgment message to the PBL Prober router P0. The PBL router P3 then propagates the PBL Probe message to PBL router P4 and non-PBL router R1. Specifically, the PBL router P3 decrements the Current TTL Indicator in the PBL Probe message, resulting in a Current TTL Indicator value of two (2), and forwards the PBL Probe message to the PBL router P4 and non-PBL router R1. The PBL router P3 then monitors the outgoing network interfaces for PBL Probe Acknowledgment messages from the PBL router P4 and non PBL router R1. Of course, the PBL router P3 does not receive a PBL Probe Acknowledgment message from the non-PBL router R1, since the non-PBL router R1 does not support the PBL protocol. Therefore, the PBL router P3 transmits a negative PBL Bounce message to the PBL Prober router P0 indicating that a non-PBL router was detected and including the network address of the non-PBL router R1. The negative PBL Bounce message includes the following information:

Prober Address=1.1.1.1
Transaction Identifier=1
Distance Indicator=1
Return Code=4
Address List Length=1
Address List=200.10.10.1

Upon receiving the PBL Probe message from the PBL router P3, the PBL router P4 sends a PBL Probe Acknowledgment message to the PBL router P3. The PBL router P4 then propagates the PBL Probe message to PBL router P7 and non-PBL router R1. Specifically, the PBL router P4 decrements the Current TTL Indicator in the PBL Probe message, resulting in a Current TTL Indicator value of one (1), and forwards the PBL Probe message to the PBL router P7 and non-PBL router R1. The PBL router P4 then monitors the outgoing network interfaces for PBL Probe Acknowledgment messages from the PBL router P7 and non-PBL router R1. Of course, the PBL router P4 does not receive a PBL Probe Acknowledgment message from the non-PBL router R1, since the non-PBL router R1 does not support the PBL protocol. Therefore, the PBL router P4 transmits a negative PBL Bounce message to the PBL Prober router P0 indicating that a non-PBL router was detected and including the network address of the non-PBL router R1. The negative PBL Bounce message includes the following information:

Prober Address=1.1.1.1
Transaction Identifier=1
Distance Indicator=2
Return Code=4
Address List Length=1
Address List=200.10.10.2

Upon receiving the PBL Probe message from the PBL router P4, the PBL router P7 sends a PBL Probe Acknowledgment message to the PBL router P4. Because the Current TTL Indicator in the PBL Probe message is equal to one (1), the PBL router P7 determines that it cannot propagate the PBL Probe message to its neighboring router(s). Therefore, the PBL router P7 transmits a negative PBL Bounce message to the PBL Prober router P0 indicating that the PBL Probe message traversed the maximum number of hops permitted and including the network address of the PBL router P7. The negative PBL Bounce message includes the following information:

Prober Address=1.1.1.1
Transaction Identifier=1
Distance Indicator=3
Return Code=3
Address List Length=1
Address List=10.10.70.70

Upon receiving the PBL Probe message, from the PBL Prober router P0, the PBL router P2 sends a PBL Probe Acknowledgment message to the PBL Prober router P0. The PBL router then propagates the PBL Probe message to PBL router P5. Specifically, the PBL router P2 decrements the Current TTL Indicator in the PBL Probe message,-resulting in a Current TTL Indicator value of two (2), and forwards the PBL Probe message to the PBL router P5.

Upon receiving the PBL Probe message from the PBL router P2, the PBL router P5 sends a PBL Probe Acknowledgment message to the PBL router P2. The PBL router then propagates the PBL Probe message to PBL border router B1 and PBL router P6. Specifically, the PBL router P5 decrements the Current TTL Indicator in the PBL Probe message, resulting in a Current TTL Indicator value of one (1), and forwards the PBL Probe message to the PBL border router B1 and PBL router P6.

Upon receiving the PBL Probe message from the PBL router P5, the PBL router P6 sends a PBL Probe Acknowledgment message to the PBL router P5. Because the Current TTL Indicator in the PBL Probe message is equal to one (1), the PBL router P6 determines that it cannot propagate the PBL Probe message to its neighboring router(s). Therefore, the PBL router P6 transmits a negative PBL Bounce message to the PBL Prober router P0 indicating that the PBL Probe message traversed the maximum number of hops permitted and including the network address of the PBL router P6. The negative PBL Bounce message includes the following information:

Prober Address=1.1.1.1
Transaction Identifier=1
Distance Indicator=3
Return Code=3
Address List Length=1
Address List=10.10.60.60

Upon receiving the PBL Probe message from the PBL Prober router P0, the PBL router P1 sends a PBL Probe Acknowledgment message to the PBL Prober router P0. The PBL router then propagates the PBL Probe message to PBL border router B1. Specifically, the PBL router P1 decrements the Current TTL Indicator in the PBL Probe message, resulting in a Current TTL Indicator value of two (2), and forwards the PBL Probe message to the PBL border router B1.

Upon receiving the PBL Probe message from the PBL router P1, the PBL border router B1 sends a PBL Probe Acknowledgment message to the PBL router P1. The PBL border router B1 then determines that is a border router within the network protocol domain being probed. The PBL border router B1 then stores the network interface address 100.10.10.10 as an exit interface, starts a timer, and monitors for duplicate PBL Probe messages received over other network interfaces. In this case, the PBL border router B1 receives a duplicate PBL Probe message from the PBL router P5 over the interface 100.10.10.20. Upon receiving the duplicate PBL Probe message from the PBL router P5, the PBL border router B1 sends a PBL Probe Acknowledgment message to the PBL router P5 and stores the network interface address 100.10.10.20 as an exit interface. When the timer expires, the PBL border router B2 transmits a positive PBL Bounce message to the PBL Prober router P0 including the network address of the exit interfaces 100.10.10.10 and 100.10.10.20. The positive PBL Bounce message includes the following information:

Prober Address=1.1.1.1
Transaction Identifier=1
Distance Indicator=2
Return Code=0
Address List Length=2
Address List 100.10.10.10, 100.10.10.20

As a result of probing the network protocol domain, the PBL Prober router P0 receives two (2) positive PBL Bounce messages and five (5) negative PBL Bounce messages. From the five (5) negative PBL Bounce messages, the PBL Prober router P0 obtains the network addresses for five (5) "leaky" interfaces, specifically the interfaces 100.30.30.30, 200.10.10.1, 200.10.10.2, 10.10.70.70, and 10.10.60.60. With this information in hand, a network administrator can take steps to fix the leaks in the network protocol domain.

In a preferred embodiment of the present invention, the PBL Prober logic is implemented as a set of computer program instructions that are stored in a computer readable medium and executed by an embedded microprocessor system within the PBL Prober, while the PBL router logic is implemented as a set of computer program instructions that are stored in a computer readable medium and executed by an embedded microprocessor system within the PBL router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Of course, the PBL protocol as described above can be modified, even substantially, while remaining within the scope of the present invention. The PBL protocol message formats described above are exemplary only, and the invention is in no way dependent upon, or limited to, a particular message format or formats. The present invention is also not limited to particular message contents. For example, while it is preferred that the PBL Bounce messages include one or more network addresses for identifying leaky and non-leaky network interfaces, the inclusion of these network addresses in the PBL Bounce messages is optional, since the PBL Prober can determine whether or not the network protocol domain is leaky based solely on the pattern of positive and negative PBL Bounce messages received. Thus, many alternative PBL protocol embodiments are possible.

In one alternative embodiment, the PBL protocol is modified so that the PBL Bounce message is only used to inform the PBL Prober of leaks in the network protocol domain. As described above, any PBL router that detects a leak transmits a negative PBL Bounce message to the PBL Prober. However, a non-leaky PBL border router does not transmit a positive PBL Bounce message to the PBL Prober. Thus, the PBL Prober receives a list of "leaky" network interfaces, which allows the PBL Prober to determine that the network protocol domain is leaky, but does not receive a list of "non-leaky" network interfaces.

In another alternative embodiment, the PBL protocol is modified so that a leak is implied by the failure of the PBL Prober to receive a positive PBL Bounce message from one or more PBL router(s) in the network protocol domain. In such an embodiment, the PBL Prober maintains a list of PBL routers in the network protocol domain. Each PBL router that detects no leaks sends a positive PBL Bounce message to the PBL Prober. Each PBL router that detects a leak remains silent. The PBL Prober monitors for a positive PBL Bounce message from each PBL router in the protocol domain. If the PBL Prober fails to receive a positive PBL Bounce message from a particular PBL router that is in the protocol domain, then the PBL Prober considers that PBL router to be a leaky point in the protocol domain (even if that router is, in fact, not a leaky point in the protocol domain). Furthermore, if the PBL Prober receives a positive PBL Bounce message from a PBL router that is not in the protocol domain (i.e., a PBL router that is not in the list of PBL routers), then the PBL Prober considers that PBL router to be a leaky point in the protocol domain.

One problem with this latter alternative embodiment as just described is that the PBL Prober may receive a positive PBL Bounce message from all PBL routers in the protocol domain even if there is a leak in the protocol domain. This can occur, for example, if a border router within the protocol domain is misconfigured as an intermediate router and its neighboring router is a PBL router in a different protocol domain. In this case, the misconfigured router does not detect a leak, so the misconfigured router sends a positive PBL Bounce message to the PBL Prober and forwards the PBL Probe message to the neighboring router. If the neighboring router determines that it is a leaky point in the network protocol domain (for example, because the neighboring router is a PBL border router in a different network protocol domain or because the TTL for the PBL Probe message is exceeded), the neighboring router remains silent. Since the PBL Prober is not expecting a response from that neighboring router (because the neighboring router is a router in a different protocol domain), the PBL Prober does not detect the leak.

One solution to this problem is for each non-leaky PBL router to indicate whether it is a border router or an intermediate router in the positive PBL Bounce message. The PBL Prober can use this additional information to detect a leak at the border of the network protocol domain, specifically by verifying that the indicator in the positive PBL Bounce message matches the expected router configuration.

Thus, the present invention provides a generic probing mechanism for probing leaky points within a network protocol domain of a communication network. The generic probing mechanism is used in for probing leaky points within a network protocol domain of a communication system. The communication system includes a probing device in communication with a number of probed device by way of a probing protocol. The generic probing mechanism probes for leaky points within the network protocol domain by transmitting a probe message by the prober device, propagating the probe message to the number of probed devices within the communication network, checking for a leaky point in the network protocol domain by each of said number of probed devices that receives the probe message, determining, by each probed device, whether to transmit a response message to the prober device, and determining, by the prober device, whether the network protocol domain is leaky based upon a pattern of response messages received by the prober device. A probed device may transmit a negative response. message indicating that the probed device detected a leaky point in the network protocol domain, a positive response message indicating that the probed device failed to detect a leaky point in the network protocol domain, or no response message. The pattern of response messages received by the prober device may include receiving a response message from a device or failing to receive a response message from a device.

The generic probing mechanism is separated into a probing function and a probed function. Various probing function embodiments include a method for probing leaky points within a network protocol domain by a prober device in a communication network, a prober device for probing leaky points within a network protocol domain of a communication network, or a program product including a computer readable program for probing leaky points by a prober device within a network protocol,domain of a communication network. Various probed function embodiments include a method for probing leaky points within a network protocol domain by a probed device in a communication network, a probed device for probing leaky points within a network protocol domain of a communication network, or a program product including a computer readable program for probing leaky points by a probed device within a network protocol domain of a communication network The present invention may be embodied in other specific forms without departing from the essence or essential characteristics. The described embodiments are to be considered in all respects only as illustrative and not restrictive.

We claim:

1. A method for probing leaky points in a network protocol domain of a communication network, the method comprising the steps of:

transmitting a probe message by a prober device, the probe message including a protocol field indicating a protocol of the network protocol domain;

propagating a probe message to a number of probed devices within the communication network;

checking for a leaky point in the network protocol domain by each of said number of probed devices that receives the probe message, including determining whether the probed device executes the protocol indicated in the protocol field of the probe message;

determining, by each probed device, whether to transmit a response message to the prober device, wherein said response message is one of:

negative response message indicating that the probed device detected a leaky point in the network protocol domain; and a positive response message indicating that the probed device failed to detect a leaky point in the network protocol domain; and determining, by the prober device, whether the network protocol domain is leaky based upon a pattern of response messages received by the prober device.

2. The method of claim 1, wherein each probed device that detects a leaky point in the network protocol domain transmits a negative response message to the prober device indicating that a leaky point was detected and wherein the step of determining whether the network protocol domain is leaky comprises:

determining that the network protocol domain is leaky if the prober device receives at least one negative response message; and determining that the network protocol domain is not leaky if the prober device fails to receive at least one negative response message.

3. The method of claim 2, wherein each border device within the network protocol domain that fails to detect a leaky point in the network protocol domain transmits a positive response message to the prober device indicating that no leaky point was detected.

4. The method of claim 1, wherein each probed device that fails to detect a leaky point in the network protocol domain transmits a positive response message to the prober device indicating that no leaky point was detected, and wherein the step of determining whether the network protocol domain is leaky comprises:

determining that the network protocol domain is not leaky if the prober device receives a positive response message from each of a predetermined group of probed devices; and determining that the network protocol domain is leaky if the prober device fails to receive a positive response message from at least one of the predetermined group of probed devices.

5. In a prober device, a method for probing leaky points within a network protocol domain of a communication network, the method comprising the steps of:

transmitting a probe message to a number of neighboring devices in the communication network, to determine whether each of the number of neighboring devices executes a protocol of the network protocol domain;

monitoring for a probe acknowledgement message from each of said neighboring devices; and determining that a neighboring device is a leaky point within the network protocol domain if the prober device fails to receive a probe acknowledgement message from the neighboring device within a predetermined period of time.

6. The method of claim 5, further comprising the steps of:

monitoring for response messages from various probed devices in the communication network that receive the probe message; and determining whether there is at least one leaky point within the network protocol domain, other than a neighboring device for which the prober device failed to receive the probe acknowledgement message within the predetermined period of time, based upon a pattern of response messages received.

7. The method of claim 6, wherein each probed device that detects a leaky point in the network protocol domain transmits a negative response message to the prober device indicating that a leaky point was detected, and wherein the step of determining whether there is at least one leaky point within the network protocol domain, other than a neighboring device for which the prober device failed to receive the probe acknowledgement message within the predetermined period of time, comprises:

determining that there is at least one leaky point within the network protocol domain, other than a neighboring device for which the prober device failed to receive the probe acknowledgement message within the predetermined period of time, if the prober device receives at least one negative response message; and determining that there is no leaky point within the network protocol domain, other than a neighboring device for which the prober device failed to receive the probe acknowledgement message within the predetermined period of time, if the prober device fails to receive at least one negative response message.

8. The method of claim 6, wherein each probed device that fails to detect a leaky point in the network protocol domain transmits a positive response message to the prober device indicating that no leaky point was detected, and wherein the step of determining whether there is at least one leaky point within the network protocol domain, other than a neighboring device for which the prober device failed to receive the probe acknowledgement message within the predetermined period of time, comprises:

determining that there is no leaky point within the network protocol domain, other than a neighboring device for which the prober device failed to receive the probe acknowledgement message within the predetermined period of time, if the prober device receives a positive response message from each of a predetermined group of probed devices; and determining that there is at least one leaky point within the network protocol domain, other than a neighboring device for which the prober device failed to receive the probe acknowledgement message within the predetermined period of time, if the prober device fails to receive a positive response message from at least one of the predetermined group of probed devices.

9. A prober device for probing leaky points within a network protocol domain of a communication network, the prober device comprising:

network interface logic operably coupled to the communication network, and probing logic operably coupled to the network interface logic, wherein the probing logic comprises:

probe messaging transmitting logic operably coupled to the network interface logic for transmitting a probe message to a number of neighboring devices in the communication network to determine whether each of the number of neighboring devices executes a protocol of the network protocol domain;

probe acknowledgement receiving logic responsive to the probe message transmitting logic and operably coupled to the network interface logic for monitoring for a probe acknowledgement message from each of said neighboring devices; and leak detection logic responsive to the probe acknowledgement receiving logic and operably coupled to determine that a neighboring device is a leaky point within the network protocol domain if the protocol acknowledgement receiving logic fails to receive a probe acknowledgement message from the neighboring device within a predetermined period of time.

10. The prober device of claim 9, wherein the probing logic further comprises probe response receiving logic operably coupled to the network interface logic for receiving response messages from various probed devices in the communication network that receive the probe message, and wherein the leak detection logic is further responsive to the probe response receiving logic and operably coupled to determine whether there is at least one leaky point within the network protocol domain, other than a neighboring device for which the prober device failed to receive the probe acknowledgement message within the predetermined period of time, based upon a pattern of response messages received.

11. The prober device of claim 10, wherein each probed device that detects a leaky point in the network protocol domain transmits a negative response message to the prober device indicating that the leaky point was detected, and wherein the leak detection logic is operably coupled to determine that there is at least one leaky point within the network protocol domain, other than a neighboring device for which the prober device failed to receive the probe acknowledgement message within the predetermined period of time, if the probe response receiving logic receives at least one negative response message.

12. The prober device of claim 10, wherein each probed device that fails to detect a leaky point in the network protocol domain transmits a positive response message to the prober device indicating that no leaky point was detected, and wherein the leak detection logic is operably coupled to determine that there is at least one leaky point within the network protocol domain, other than a neighboring device for which the prober device failed to receive the probe acknowledgement message within the predetermined period of time, if the probe response receiving logic fails to receive a positive response message from at least one of a predetermined group of probed devices.

13. A program product comprising a computer readable medium having embodied therein a computer readable program for probing leaky points within a network protocol domain by a prober device in a communication network, the computer readable program comprising:
   probe message transmitting logic programmed to transmit a probe message to a number of neighboring devices in the communication network to determine if each of the number of neighboring devices execute a protocol of the network protocol domain;
   probe acknowledgement receiving logic programmed to monitor for a probe acknowledgement message from each of said neighboring devices; and
   leak detection logic programmed to determine that a neighboring device is a leaky point within the network protocol domain if the protocol acknowledgement receiving logic fails to receive a probe acknowledgement message from the neighboring device within a predetermined period of time.

14. The program product of claim 13, further comprising probe response receiving logic programmed to receive response messages from various probed devices in the communication network that receive the probe message, and wherein the leak detection logic is further programmed to determine whether there is at least one leaky point within the network protocol domain, other than a neighboring device for which the prober device failed to receive the probe acknowledgement message within the predetermined period of time, based upon a pattern of response messages received.

15. The program product of claim 14, wherein each probed device that detects a leaky point in the network protocol domain transmits a negative response message to the prober device indicating that a leaky point was detected, and wherein the leak detection logic is programmed to determine that there is at least one leaky point within the network protocol domain, other than a neighboring device for which the prober device failed to receive the probe acknowledgement message within the predetermined period of time, if the probe response receiving logic receives at least one negative response message.

16. The proven product of claim 14, wherein each probed device that fails to detect a leaky point in the network protocol domain transmits a positive response message to the prober device indicating that no leaky point was detected, and wherein the leak detection logic is programmed to determine that there is at least one leaky point with in the network protocol domain, other than a neighboring device for which the prober device failed to receive the probe acknowledgement message within the predetermined period of time, if the probe response receiving logic fails to receive a positive response message from at least one of a predetermined group of probed devices.

17. A method for probing leaky points within a network protocol domain by a probed device in a communication network, the method comprising the steps of:
   receiving, from a neighboring device, a probe message originated by a prober device in the communication network, the probe message for determining whether the probed devices executes a protocol of the network protocol domain;
   transmitting a probe acknowledgement message to the neighboring device;
   checking for a leaky point in the network protocol domain; and
   determining whether to transmit a response message to the prober device based upon whether the probed device detected a leaky point in the network protocol domain, wherein said response message is one of:
   a negative response message indicating that the probed device detected a leaky point in the network protocol domain; and
   a positive response message indicating that the probed device failed to detect a leaky point in the network protocol domain.

18. The method of claim 17, wherein the probed device transmits a negative response message to the prober device if the probed device detects at least one leaky point in the network protocol domain.

19. The method of claim 18, wherein the probed device transmits a positive response message to the prober device if the probed device is a border router within the network protocol domain.

20. The method of claim 17, wherein the probed device transmits a positive response message to the prober device if the probed device fails to detect a leaky point in the network protocol domain.

21. The method of claim 17, wherein the probe message includes a protocol identifier identifying a networking protocol being probed, and wherein the probed device is a leaky point in the network protocol domain if the probed device does not support the networking protocol identified by the protocol identifier.

22. The method of claim 17, wherein the probe message includes a protocol identifier identifying a networking protocol being probed and a protocol verification indicator indicating whether or not the probed device is required to support the networking protocol identified by the protocol identifier, and wherein the probed device is a leaky point in the network protocol domain if the probed device does not support the networking protocol identified by the protocol identifier and the protocol verification indicator indicates that the probed device is required to support the networking protocol identified by the protocol identifier.

23. The method of claim 17, wherein the probe message includes a protocol identifier identifying a networking protocol being probed and a domain identifier identifying the network protocol domain being probed, and wherein the probed device is a leaky point in the network protocol domain if the probed device is a border device that supports the networking protocol identified by the protocol identifier and is not within the network protocol domain identified by the domain identifier.

24. The method of claim 17, wherein the probe message includes a time-to-live indicator indicating a maximum number of hops over which the probe message is permitted to traverse, and wherein the probed device is a leaky point in the network protocol domain if the probe message has traversed the maximum number of hops permitted based upon the time-to-live indicator in the probe message.

25. The method of claim 17, wherein the step of checking for a leaky point in the network protocol domain comprises forwarding the probe message by the probed device to a number of neighboring devices, and wherein a neighboring device is a leaky point in the network protocol domain if the probed device does not receive a probe acknowledgement message from the neighboring device within a predetermined period of time.

26. The method of claim 25, wherein the probe message includes a time-to-live indicator indicating a maximum number of hops over which the probe message is petted with traverse, and wherein the step of forwarding the probe message to the number of neighboring devices comprises decreasing the time-to-live indicator in the probe message by one (1).

27. The method of claim 17, wherein the negative response message includes a result code identifying the leaky point detected by the probed device, and optionally includes a network address identifying the leaky point detected by the probed device.

28. The method of claim 17, wherein the positive response message optionally includes a list of network addresses identifying each non-leaky network interface detected by the probed device.

29. A probed device for probing leaky points within a network protocol domain of a communication network, the probed device comprising:
   network interface logic operably coupled to the communication network; and
   probing logic operably coupled to the network interface logic, wherein the probing logic determines whether neighboring devices execute a protocol of the network protocol domain, wherein the probing logic comprises:
      probe message receiving logic operably coupled to the network interface logic for receiving from a neighboring device a probe message originated by a prober device in the communication network;
      probe acknowledgement transmitting logic responsive to the probe message receiving logic and operably coupled to transmit a probe acknowledgement message to the neighboring device;
      leak detection logic responsive to the probe message receiving logic and operably coupled to check for a leaky point in the network protocol domain; and
      probe response transmitting logic responsive to the leak detection logic and operably coupled to determine whether to transmit a response message to the prober device based upon whether the leak detection logic detected a leaky point in the network protocol domain, wherein said response message is one of:
         a negative response message indicating that the lead detection logic detected a leaky point in the network protocol domain; and
         a positive response message indicating that the leak detection logic failed to detect a leaky point in the network protocol domain.

30. The probed device of claim 29, wherein the probe response transmitting logic is operably coupled to transmit a negative response message to the prober device if the leak detection logic detects at least one leaky point in the network protocol domain.

31. The probed device of claim 30, wherein the probe response transmitting logic is operably coupled to transmit a positive response message to the prober device if the probed is device is a border router within the network protocol domain.

32. The probed device of claim 29, wherein the probe response transmitting logic is operably coupled to transmit a positive response message to the probe device if the leak detection logic fails to detect a leaky point in the network protocol domain.

33. The probed device of claim 29, wherein the probe message includes a protocol identifier identifying a networking protocol being probed, and wherein leak detection logic is operably coupled to determine that the probed device is a leaky point in the network protocol domain if the probed device does not support the networking protocol identified by the protocol identifier.

34. The probed device of claim 29, wherein the probe message includes a protocol identifier identifying a networking protocol being probed and a protocol verification indicator indicating whether or not the probed device is required to support the networking protocol identified by the protocol identifier, and wherein the leak detection logic is operably coupled to determine that the probed device is a leaky point in the network protocol domain if the probed device does not support the networking protocol identified by the protocol identifier and the protocol verification indicator indicates that the probed device is required to support the networking protocol identified by the protocol identifier.

35. The probed device of claim 29, wherein the probe message includes a protocol identifier identifying a network protocol being probed and a domain identifier identifying the network protocol domain being probed, and wherein the leak detection logic is operably coupled to determine that the probed device is a leaky point in the network protocol domain if the probed device is a border device that supports the networking protocol identified by the protocol identifier and is not within the network protocol domain identified by the domain identifier.

36. The probed device of claim 29, wherein the probe message includes a time-to-live indicator indicating a maximum number of hops over which the probe message is permitted to traverse, and wherein the leak detection logic is operably coupled to determine that the probed device is a leaky point in the network protocol domain if the probe message has traversed the maximum number of hops permitted based upon the time-to-live indicator in the probe message.

37. The probed device of claim 29, wherein the leak detection logic is operably coupled to forward the probe message to a number of neighboring devices, and wherein the leak detection logic is operably coupled to determine that a neighboring device is a leaky point in the network protocol domain if the leak detection logic does not receive a probe acknowledgement message from the neighboring device within a predetermined period of time.

38. The probed device of claim 37, wherein the probe message includes a time-to-live indicator indicating a maximum number of hops over which the probe message is permitted to traverse, and wherein the leak detection logic is operably coupled to decrement the time-to-live indicator in the probe message by one (1) before forwarding the probe message to the neighboring devices.

39. The probed device of claim 29, wherein the negative response message includes a result code identifying the leaky point detected by the leak detection logic, and optionally includes a network address identifying the leaky point detected by the leak detection logic.

40. The probed device of claim 29, wherein the positive response message optionally includes a list of network addresses identifying each non-leaky network interface detected by the leak detection logic.

41. A program product comprising a computer readable medium having embodied therein a computer readable program for probing leaky points within a network protocol domain by a probed device in a communication network, the computer readable program comprising:

probe messaging receiving logic programmed to receive from a neighboring device a probe message oriented by a prober device in the communication network, the probe message for determining whether the probed device executes a protocol of the network protocol domain;

probe acknowledgement transmitting logic programmed to transmit a probe acknowledgement message to the neighboring device;

leak detection logic programmed to check for a leaky point in the network protocol domain; and probe response transmitting logic programmed to determine whether to transmit a response message to the prober device based upon whether the leak detection logic detected a leaky point in the network protocol domain, wherein said response message is one of:

a negative response message indicating that the leak detection logic detected a leaky point in the network protocol domain; and a positive response message indicating that the leak detection logic failed to detect a leaky point in the network protocol domain.

42. The program product of claim 41, wherein the probe response transmitting logic is programmed to transmit a negative response to the prober device if the leak detection logic detects at least one leaky point in the network protocol domain.

43. The program product of claim 42, wherein the probe response transmitting logic is programed to transmit a positive response message to the prober device if the probed device is a border router within the network protocol domain.

44. The program product of claim 41, wherein the probe response transmitting logic is programmed to transmit a positive response message to the prober device if the leak detection logic fails to detect a leaky point in the network protocol domain.

45. The program product of claim 41, wherein the probe message includes a protocol identifier identifying a network protocol being probed, and wherein leak detection logic is programmed to determine that the probed device is a leaky point in the network protocol domain if the probed device does not support the networking protocol identified by the protocol identifier.

46. The program product of claim 41, wherein the probe message includes a protocol identifier identifying a networking protocol being probed and a protocol verification indicator indicating whether or not the probed device is required to support the networking protocol identified by the protocol identifier, and wherein the leak detection logic is programmed to determine that the probed device is a leaky point in the network protocol domain if the probed device does not support the networking protocol identified by the protocol identifier and the protocol verification indicator indicates that he probed device is required to support the networking protocol identified by the protocol identifier.

47. The program product of claim 41, wherein the probe message includes a protocol identifier identifying a network protocol being probed and a domain identifier identifying the network protocol domain being probed, and wherein the leak detection logic is programmed to determine that the probe device is a leaky point in the network protocol domain if the probed device is a border device that supports the network protocol identified by the protocol identifier and is not within the network protocol domain identified by the domain identifier.

48. The program product of claim 41, wherein the probe message includes a time-to-live indicator indicating a maximum number of hops over which the probe message is permitted to traverse, and wherein the leak detection logic is programed to determine that the probed device is a leaky point in the network protocol domain if the probe message has traversed the maximum number of hops permitted based upon the time-to-live indicator in the probe message.

49. The program product of claim 41, wherein the leak detection logic is programmed to forward the probe message to a number of neighboring devices, and wherein the leak detection logic is programmed to determine that a neighboring device is a leaky point in the network protocol domain if the leak detection logic does not receive a probe acknowledgement message from the neighboring device within the predetermined period of time.

50. The program product of claim 49, wherein the probe message includes a time-to-live indicator indicating a maximum number of hops over which the probe message is permitted to traverse, and wherein the leak detection logic is programmed to decrement the time-to-live indicator in the probe message by one (1) before forwarding the probe message to the neighboring devices.

51. The program product of claim 41, wherein the negative response message includes a result code identifying the leaky point detected by the leak detection logic, and optionally includes a network address identifying the leaky point detected by the leak detection logic.

52. The program product of claim 41, wherein the positive response message optionally includes a list of network addresses identifying each non-leaky network interface detected by the leak detection logic.

53. A communication system comprising a prober device in communication with a number of probed devices by way of a probing protocol, wherein:

the prober device transmits a probe message over the communication system, the probe message for determining which of the number of probed devices executes a protocol; each probed device that receives the probe message from a neighboring device transmits a probe acknowledgement message to the neighboring device and checks for a leaky point in the network protocol domain; and each probed device determines whether to transmit a response message to the prober device based upon whether the probed device detected a leaky point in the network protocol domain, wherein the response message is one of:

a negative response message indicating that the probed device detected a leaky point in the network protocol domain; and a positive response message indicating that the probed device failed to detect a leaky point in the network protocol domain.

54. The system of claim 53, wherein each probed device that detects a leaky point in the network protocol domain transmits a negative response message to the prober device indicating that a leaky point was detected.

55. The system of claim 54, wherein each border device within the network protocol domain that fails to detect a leaky point in the network protocol domain transmits a positive response message to the prober device indicating that no leaky point was detected.

56. The system of claim 53, wherein each probed device that fails to detect a leaky point in the network protocol domain transmits a positive response message to the prober device indicating that no leaky point was detected.

* * * * *